No. 615,893. Patented Dec. 13, 1898.
J. PÉRICHON.
DIFFUSION BATTERY.
(Application filed Dec. 21, 1897.)
(No Model.) 2 Sheets—Sheet I.

Witnesses
Jean Périchon
by his attorneys

No. 615,893. Patented Dec. 13, 1898.
J. PÉRICHON.
DIFFUSION BATTERY.
(Application filed Dec. 21, 1897.)

(No Model.) 2 Sheets—Sheet 2.

Witnesses
Jean Périchon
by his attorneys

UNITED STATES PATENT OFFICE.

JEAN PÉRICHON, OF RODAH, EGYPT.

DIFFUSION-BATTERY.

SPECIFICATION forming part of Letters Patent No. 615,893, dated December 13, 1898.

Application filed December 21, 1897. Serial No. 662,921. (No model.)

*To all whom it may concern:*

Be it known that I, JEAN PÉRICHON, a citizen of the Republic of France, and a resident of Rodah, Egypt, have invented a new and Improved Apparatus for the Treatment of Bagasse, which invention is fully set forth in the following specification, and for which I have obtained patents in Great Britain, No. 7,337, dated April 4, 1896, and in Spain, No. 18,865, dated April 4, 1896.

This invention relates to improvements in the treatment of bagasse; and its object is to extract therefrom by washing after the first or second passage through the roller-mills the largest possible amount of juice of the greatest possible density. The method I adopt for this purpose, unlike the diffusion process commonly employed, enables the roller-mills to be made use of and the apparatus and its operation to be simplified, and, while enabling working to be conducted with economy, insures a high yield.

Figure 1:
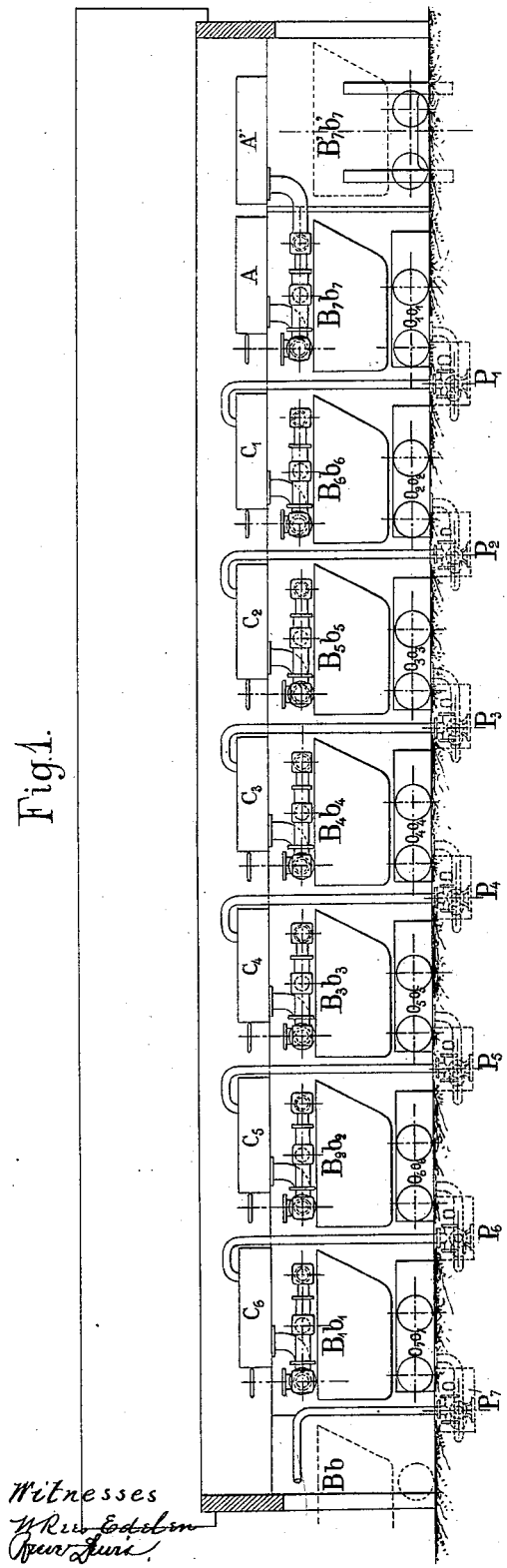
Figure 2:
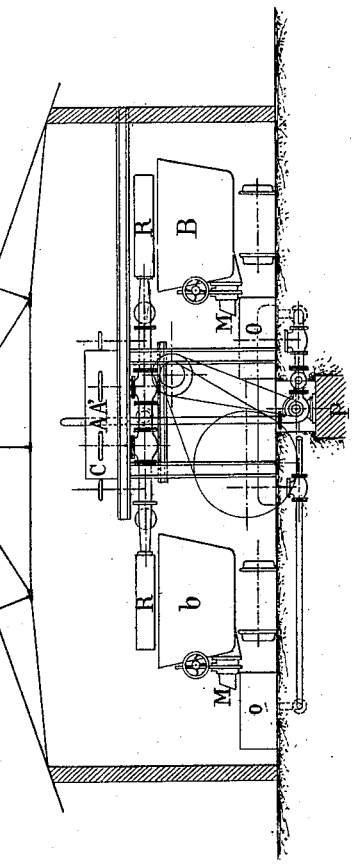
Figure 3:
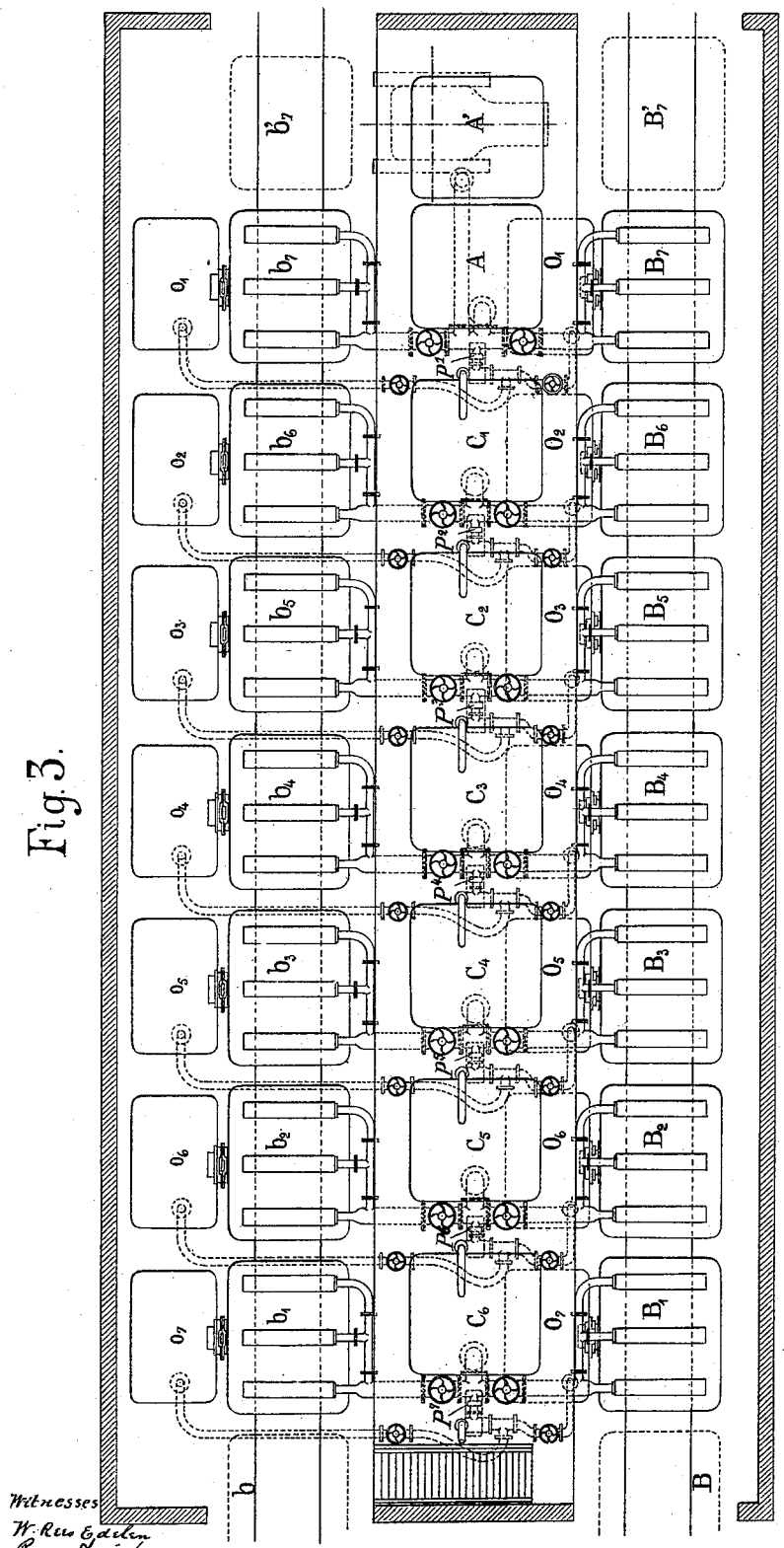

In the accompanying drawings, Figure 1 is a front elevation, Fig. 2 an end elevation, and Fig. 3 a plan, of apparatus arranged in a special building for carrying out my invention.

A A' are heating-tanks containing pure water heated to about 97° centigrade or water mixed with a certain amount of normal juice—that is to say, juice extracted by the first pressing or of juice resulting from one of the subsequent pressings.

$B'$ $B^2$ $B^3$ $B^7$ and $b'$ $b^2$ $b^3$ $b^7$ are washing-vats, preferably mounted on wheels and each capable of being tipped on trunnions for the purpose of being completely emptied. They are mounted on two parallel tracks in two series or rows, each containing a suitable number of vats. The vats are charged with bagasse that has been more or less crushed and which is brought and discharged into them by a conveyer, which may be in the form of an endless jointed apron acting as a large horizontal belt. The bagasse may have been saturated with juice on its passage from the rolls, but it is usually in the ordinary condition of crushed or recrushed bagasse. This bagasse is allowed to soak in liquid in the vats during a sufficient period of time, such soaking being repeated a suitable number of times with fresh liquid for each soaking operation.

A device M arranged at the lower part and at the side of each vat enables the liquid to be run off. Above the washing-vats there are arranged heating-tanks $C'$ $C^2$ $C^3$ $C^6$, in which juice supplied thereto is heated by means of coils or bundles of pipes or tubing through which steam is caused to pass, after which the juice is discharged from the said vats. Below the washing-vats there are arranged discharging-troughs $O'$ $O^2$ $O^3$ $O^7$ and $o'$ $o^2$ $o^3$ $o^7$, corresponding to the vats $B^7$ $B^6$ $B^5$ $B'$ and $b^7$ $b^6$ $b^5$ $b'$. $P'$ $P^2$ $P^3$ $P^6$ are pumps that serve to draw liquid from the troughs $O'$ $O^2$ $O^3$ $O^6$ and $o'$ $o^2$ $o^3$ $o^6$ alternately and lift it into the heating-tanks $C'$ $C^2$ $C^3$ $C^6$. The pump $P^7$ draws liquid from the troughs $O^7$ and $o^7$ alternately and delivers it to the defecating apparatus in the factory. Above the washing-vats there are also arranged spraying devices R, which serve to distribute the soaking liquid in a uniform manner over the bagasse contained in the vats.

The washing-vats have false bottoms of perforated sheet metal, and each is provided in its upper part with a perforated or reticulated cover, which enables the bagasse to be kept at a constant level while pressing it gently upon the false bottom during the washing. Each cover may be movable, so that it may enable the bagasse to be alternately compressed and allowed to expand in a vertical direction for the purpose of promoting the mixture of the liquids by absorption and reabsorption. The number of washing-vats to be used is determined by the degree of density which it is desired that the juice shall have after the washing is completed.

It will be seen from the drawings that the same heating-tank and the same pump are employed for a vat of the series B and the corresponding vat of the series b alternately. This constitutes a considerable improvement in the plant.

The washing-vats having been charged and being in the positions shown in the drawings, soaking first takes place, as regards the series B, in the vat $B^7$, and with pure water heated to 97° centigrade and supplied from the heating-tank A. The liquid run off from this vat and drawn up by the corresponding pump serves for soaking the bagasse in the vat $B^6$, and so on. The same takes place with the series of vats $b$, which is supplied from the heating-tank $A^8$, or one tank may be used for delivering liquid to the tanks while the liquid in the other is being heated in readiness for subsequent use. When the liquid of the vat $B'$ runs off into the lower trough $O^7$, the apparatus is in full operation, and as soon as the liquid in this vat has been completely run off a fresh vat B is coupled up in the position indicated by dotted lines, and the row of traveling vats is caused to move forward through the length of a vat, and so on. The apparatus will be in full, continual, and intermittent operation as soon as the vat B has arrived in the position of the vat $B^7$, and the contents of every vat that is uncoupled and moved out of the building will thenceforth have been subjected to seven successive washings. The same operation takes place with the series of vats $b$, so that the plant is double-acting. The period during which the washing liquid remains in contact with the bagasse in each vat is longer or shorter according to the capacity of the vats; but this period should never be less than six minutes.

I shall now proceed to describe the progress of the liquid when the apparatus is in full operation.

The washing liquid in the vat $B^7$ having been run off into the trough $O'$, the pump $P'$ raises it into the heater $C'$, wherein it is heated again before being discharged over the bagasse in the vat $B^6$, with which it remains in contact for six minutes at least. After this time the soaking liquid is run off into the trough $O^2$, whence it is delivered by the pump $P^2$ into the heating-tank $C^2$, wherein it is heated and then discharged over the bagasse in the vat $B^5$, and so on until it reaches the pump $P^7$, which finally delivers the washed-out juice from the vat $B'$ to the factory, where it undergoes defecation. The defecation may, however, be begun or carried out in the washing-vats or in the heaters.

It will be noted that while the liquid is traveling from $A B^7 O' P^7$ to $B' O^7 P^7$ the washing-vats are traveling in the contrary direction—namely, from $B'$ to $B^7$—the train of seven vats of each of the series B and $b$ moving forward through exactly the length of a washing-vat after each washing. Hence in order to insure the perfect working of the process the work of the two series of vats must alternate—that is to say, while liquid is being delivered to the vats of one series and bagasse is being soaked therein in the liquids of various degrees of richness in syrup the other series of vats is draining. At the same time each pump is drawing the liquid drained off alternately into the troughs $O' O^2$, &c., of the series B, the troughs $o' o^2$, &c., of the series $b$, and delivering it to the heating-tanks $C' C^2$, &c., above. When the bagasse in the vat $B^7$ has received its seventh and last washing, which is generally effected with pure water heated to 97° centigrade, and when the washing liquid has been run off into the trough $O'$ the train of washing-vats is caused to move forward through the length of a vat after having had coupled to it a vat B filled with bagasse supplied by the conveyer. The vat $B^7$ then moves into the exit position $B'^7$, and it is now uncoupled from the train and sent to a conveyer or other discharging apparatus, where the bagasse is preferably discharged by tipping, to be again sent to the crushing-mill.

With the object of increasing the density of the washed-out juice I may employ a certain quantity of ordinary defecated or undefecated juice coming from the mills to fill up the first washing-vats $B'$ and $b'$, this mixing of ordinary juice with the washing liquid being effected either in the washing-vats or in their heaters. I may likewise use the liquid produced by the mill that crushes the washed bagasse, and I may cause it to enter at any point or at any time during the washing of the bagasse by mixing it or not with the washing liquid. This return juice may, moreover, be extracted from the washed bagasse by centrifugal separation or by means of a slight pressure produced by a suitable apparatus.

What I claim is—

The apparatus for extracting saccharine matter from bagasse consisting of a series of elevated stationary heating-vats, a series of stationary drainage-vats arranged parallel with and on a plane below the heating-vats, a series of soaking-vats arranged to move intermittently past the heating and drainage vat and means for transferring the liquid from the soaking-vats to the drainage-vats, from the drainage-vats to the heating-vats, and from the heating-vats to the soaking-vats, substantially as described.

In testimony whereof I have signed this specification in the presence of two subscribing witnesses.

JEAN PÉRICHON.

Witnesses:
  JAMES WILSON,
  PIERRE BIANCHI.